(12) United States Patent
Murgia et al.

(10) Patent No.: US 9,343,073 B1
(45) Date of Patent: May 17, 2016

(54) ROBUST NOISE SUPPRESSION SYSTEM IN ADVERSE ECHO CONDITIONS

(75) Inventors: Carlo Murgia, Sunnyvale, CA (US); Ye Jiang, Sunnyvale, CA (US); Michael M. Goodwin, Scotts Valley, CA (US); Mark Every, Palo Alto, CA (US)

(73) Assignee: Knowles Electronics, LLC, Itasca, IL (US)

( * ) Notice: Subject to any disclaimer, the term of this patent is extended or adjusted under 35 U.S.C. 154(b) by 716 days.

(21) Appl. No.: 12/860,428

(22) Filed: Aug. 20, 2010

Related U.S. Application Data (60) Provisional application No. 61/326,116, filed on Apr. 20, 2010.

(51) Int. Cl.
*H04B 15/00* (2006.01)
*G10L 19/012* (2013.01)

(52) U.S. Cl.
CPC .................................. *G10L 19/012* (2013.01)

(58) Field of Classification Search
USPC ................... 381/73.1, 71.1, 83, 94.1–94.5; 379/406.01–406.16; 704/226
See application file for complete search history.

(56) References Cited

U.S. PATENT DOCUMENTS

| | | | | |
|---|---|---|---|---|
| 6,269,161 | B1 * | 7/2001 | McLaughlin et al. | ... 379/406.01 |
| 6,507,653 | B1 * | 1/2003 | Romesburg | 379/406.05 |
| 6,760,435 | B1 * | 7/2004 | Etter et al. | 379/406.01 |
| 6,859,531 | B1 * | 2/2005 | Deisher | 379/406.05 |
| 7,003,099 | B1 * | 2/2006 | Zhang et al. | 379/406.03 |
| 7,039,181 | B2 * | 5/2006 | Marchok et al. | 379/406.03 |
| 7,062,040 | B2 * | 6/2006 | Faller | 379/406.11 |
| 7,212,628 | B2 * | 5/2007 | Popovic et al. | 379/406.08 |
| 7,742,592 | B2 * | 6/2010 | Faller | 379/406.01 |
| 8,295,476 | B2 | 10/2012 | Liu | |
| 9,191,519 | B2 | 11/2015 | Kawabata | |
| 2004/0247111 | A1 * | 12/2004 | Popovic et al. | 379/406.01 |
| 2007/0058799 | A1 * | 3/2007 | Sudo | 379/406.01 |
| 2007/0237271 | A1 * | 10/2007 | Pessoa et al. | 375/346 |
| 2008/0292109 | A1 * | 11/2008 | Trump et al. | 381/66 |
| 2011/0019832 | A1 * | 1/2011 | Itou et al. | 381/66 |
| 2011/0178798 | A1 * | 7/2011 | Flaks et al. | 704/226 |
| 2012/0045069 | A1 * | 2/2012 | Sun | 381/66 |

OTHER PUBLICATIONS

Goldin et al, Automatic Volume and Equalization Control in mobile devices, AES, 2006.*
Guelou et al, Analysis of two Structures for Combined Acoustic Echo Cancellation and Noise Reduction, IEEE, 1996.*
Park et al, Soft Decision Based Acoustic echo suppression in a frequency domain, interspeech 2009.*

* cited by examiner

*Primary Examiner* — Davetta W Goins
*Assistant Examiner* — Kuassi Ganmavo
(74) *Attorney, Agent, or Firm* — Carr & Ferrell LLP (57) ABSTRACT

The present technology provides adaptive noise and echo reduction of an acoustic signal which can overcome or substantially alleviate problems associated with mistaken adaptation of speech and noise models to acoustic echo. The present technology carries out a multi-faceted analysis to identify echo within the near-end acoustic signal to derive an echo model. Echo classification information regarding the derived echo model is then utilized to build near-end speech and noise models. These echo, speech, and noise models are then used to generate one or more signal modifications applied to the acoustic signal to preserve the desired near-end speech signal and reduce the echo and near-end noise signals. By building near-end speech and noise models utilizing echo classification information, the present technology can prevent adaptation of the speech and noise model to the acoustic echo.

15 Claims, 7 Drawing Sheets

ROBUST NOISE SUPPRESSION SYSTEM IN ADVERSE ECHO CONDITIONS

CROSS REFERENCE TO RELATED APPLICATIONS

This application claims the benefit of U.S. Provisional Application No. 61/326,116, filed on Apr. 20, 2010, entitled "Robust Noise Suppression in Adverse Echo Conditions", which is incorporated herein by reference.

BACKGROUND

1. Field of the Invention

The present invention relates generally to audio processing, and more particularly to reducing noise and echo within an acoustic signal.

2. Description of Related Art

Various types of audio devices such as cellular phones, phone handsets, headsets, and conferencing systems can suffer from the problem of acoustic echo, which is a delayed and distorted version of an original sound reflected back to its source. In a typical conversation, a far-end acoustic signal of a remote person speaking at the "far-end" is transmitted over a network to an audio device of a person listening at the "near-end." When the far-end acoustic signal is presented through a speaker of the audio device, an acoustic wave is generated within the near-end acoustic environment. Part of this acoustic wave may be reflected via an echo path to a microphone or other acoustic sensor of the audio device. This reflected signal may then be processed by the audio device and transmitted back to the remote person, resulting in echo. As such, the remote person will hear a delayed and distorted version of their own speech, which can interfere with normal communication and is annoying.

In order to reduce or eliminate this echo, an acoustic echo canceller may be utilized in the audio device. The far-end acoustic signal may be used by the acoustic echo canceller to predict the echo within the near-end acoustic signal received by the microphone. Typically, a transfer function is modeled to predict the echo path from the speaker to the microphone. Echo cancellation can then be performed in the waveform domain, whereby the echo is predicted, inverted, delayed, and subtracted out of the near-end acoustic signal.

Since the near-end acoustic environment is rarely fixed, the echo path is typically constantly changing. As a result, the acoustic echo canceller is continually updating the transfer function used to model the echo path. Errors in the echo prediction usually occur due to the difficultly in accurately modeling the changing environment. If the transfer function is even slightly incorrect, or an applied delay is incorrect, echo will remain in the near-end acoustic signal.

This echo can be problematic for a noise reduction system within the audio device. The noise reduction system is used to reduce background noise within the near-end acoustic signal to improve voice and/or call quality. The noise reduction system may extract and track speech characteristics such as pitch and level in the near-end acoustic signal to build near-end speech and noise models. These speech and noise models are used to generate a signal modification that preserves the desired near-end speech signal and suppresses the unwanted near-end noise signals.

However, for applications such as teleconferencing and other hand-free communication scenarios, the echo can also possess strong speech characteristics such as high pitch saliency and level. As a result, the echo may appear to be another speech source to the noise reduction system. Consequently, the noise reduction system may mistakenly adapt its speech and noise models to the echo, resulting in damaged speech or echo leakage in the processed signal.

It is therefore desirable to provide noise and echo reduction techniques which can increase the quality and responsiveness of noise reduction systems.

SUMMARY

The present technology provides adaptive noise and echo reduction of an acoustic signal which can overcome or substantially alleviate problems associated with mistaken adaptation of speech and noise models to acoustic echo. The present technology carries out a multi-faceted analysis to identify echo within the near-end acoustic signal to derive an echo model. Echo classification information regarding the derived echo model is then utilized to build near-end speech and noise models. These echo, speech, and noise models are then used to generate one or more signal modifications applied to the acoustic signal to preserve the desired near-end speech signal and reduce the echo and near-end noise signals. By building near-end speech and noise models utilizing echo classification information, the present technology can prevent adaptation of the speech and noise model to the acoustic echo.

A method for reducing noise within an acoustic signal as described herein includes receiving a first acoustic signal at a microphone and a second acoustic signal via a receiver. An energy level of an echo component is determined in the first acoustic signal. The echo component comprises the second acoustic signal coupled to the microphone via an echo path. An energy level of a noise component in the first acoustic signal is then determined based on the determined energy level of the echo component. One or more signal modifications are then applied to reduce the energy levels of the noise and echo components in the first acoustic signal, the one or more signal modifications based on the energy levels of the noise and echo components.

A system for reducing noise within an acoustic signal as described herein includes a microphone to receive a first acoustic signal and a receiver to receive a second acoustic signal. The system further includes an audio processing system to determine an energy level of an echo component in the first acoustic signal. The echo component comprises the second acoustic signal coupled to the microphone via an echo path. The audio processing system further determines an energy level of a noise component in the first acoustic signal based on the determined energy level of the echo component. The audio processing system also applies one or more signal modifications to reduce the energy levels of the noise and echo components, the one or more signal modifications based on the energy levels of the noise and echo components.

A computer readable storage medium as described herein has embodied thereon a program executable by a processor to perform a method for reducing noise within an acoustic signal as described above.

Other aspects and advantages of the present invention can be seen on review of the drawings, the detailed description, and the claims which follow.

DETAILED DESCRIPTION

The present technology provides adaptive noise and echo reduction of an acoustic signal which can overcome or substantially alleviate problems associated with mistaken adaptation of speech and noise models to acoustic echo. The present technology carries out a multi-faceted analysis to identify echo within the near-end acoustic signal to derive an echo model. Echo classification information regarding the derived echo model is then utilized to build near-end speech and noise models. These echo, speech, and noise models are then used to generate one or more signal modifications applied to the acoustic signal to preserve the desired near-end speech signal and reduce the echo and near-end noise signals. By building near-end speech and noise models utilizing the echo classification information, the present technology can prevent adaptation of the near-end speech and noise models to the acoustic echo.

The echo classification information is derived by an echo/near-end classifier module to identify the portions of the acoustic signal which are dominated by the acoustic echo, and thus should be ignored by a speech/noise classifier module. The speech/noise classifier module can then build near-end speech and noise models of the acoustic signal utilizing the echo classification information to prevent adaption to the already identified acoustic echo. The echo classification information may be in the form of a spectral envelope or mask to be applied to the acoustic signal to reduce or eliminate the energy level of the echo. Alternatively, the echo classification information may be in the form of a control signal used to update or freeze the estimation of the near-end speech/noise models by the speech/noise classifier module.

Embodiments of the present technology may be practiced on any audio device that is configured to receive and/or provide audio such as, but not limited to, cellular phones, phone handsets, headsets, and conferencing systems. While some embodiments of the present technology will be described in reference to operation on a cellular phone, the present technology may be practiced on any audio device.

Figure 1:
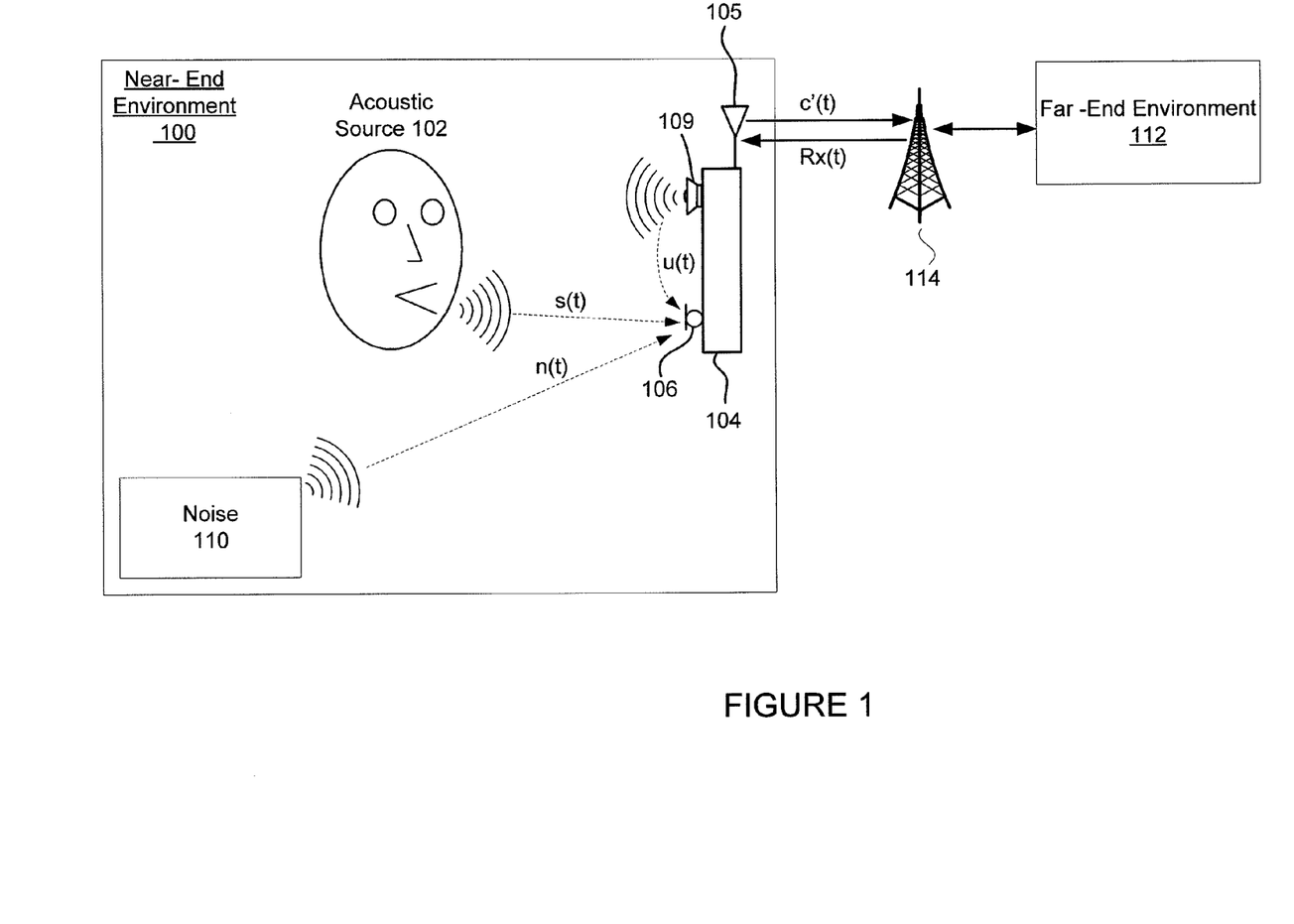
FIG. 1 is an illustration of an environment in which embodiments of the present technology may be used.

FIG. 1 is an illustration of an environment in which embodiments of the present technology may be used. A user 102 (also referred to herein as acoustic source 102) in a near-end environment 100 may act as an acoustic (speech) source to an audio device 104. The exemplary audio device 104 includes a primary microphone 106, speaker 109, and an audio processing system (not illustrated in FIG. 1) to perform noise and echo reduction using the techniques described herein. In some embodiments, the audio device 104 may include more than one microphone, such as for example two, three, four, five, six, seven, eight, nine, ten or even more microphones. The primary microphone 106 and any additional microphones may be omni-directional microphones. Alternative embodiments may utilize other forms of microphones or acoustic sensors.

While the primary microphone 106 receives sound (i.e. acoustic signals) from the user 102, the primary microphone 106 will also pick-up noise 110 in the near-end environment 100. Although the noise 110 is shown coming from a single location in FIG. 1, the noise 110 may include any sounds from one or more locations that differ from the location of the user 102, and may include reverberation. The noise 110 may be stationary, non-stationary, and/or a combination of both stationary and non-stationary noise.

The audio device 104 also receives a far-end acoustic signal Rx(t) via a communication network 114. In the illustrated example, the far-end acoustic signal Rx(t) is wirelessly received from the communication network 114 via an antenna device 105. The far-end acoustic signal Rx(t) comprises speech from the far-end environment 112, such as speech of a remote person talking into a second audio device. As used herein, the term "acoustic signal" refers to a signal derived from an acoustic wave corresponding to actual sounds, including acoustically derived electrical signals which represent an acoustic wave. For example, the far-end acoustic signal Rx(t) is an acoustically derived electrical signal that represents an acoustic wave in the far-end environment 112. The far-end acoustic signal Rx(t) can be processed to determine characteristics of the acoustic wave such as acoustic frequencies and amplitudes.

The audio device 104 presents received far-end acoustic signal Rx(t) through the speaker 109 to generate an acoustic wave within the near-end environment 100. Part of this acoustic wave may be reflected via an echo path in the near-end environment 100 and picked up by the primary microphone 106.

The total signal received by the primary microphone 106 (referred to herein as the primary acoustic signal c(t)) may be represented as a superposition of a near-end speech component s(t) from the user 102, a noise component n(t) from noise 110, and an echo component u(t) of the far-end acoustic signal Rx(t) from the speaker 109. This may be represented mathematically as $c(t)=s(t)+n(t)+u(t)$.

As described below, the audio device 104 processes the primary acoustic signal c(t) to remove or reduce the noise component n(t) and echo component u(t) using the techniques described herein. A noise and echo reduced acoustic signal c'(t) may then be transmitted by the audio device 104 to the far-end environment 112 via the communications network 114.

Figure 2:
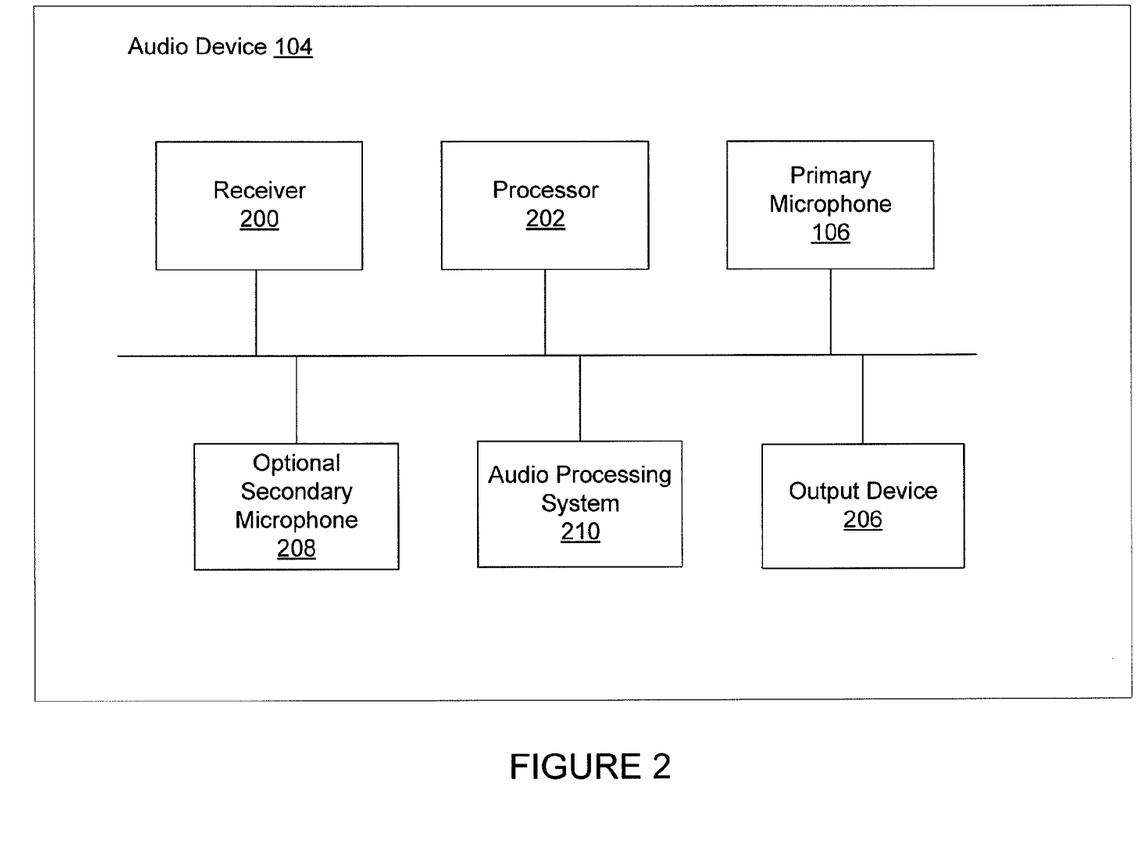
FIG. 2 is a block diagram of an exemplary audio device.

FIG. 2 is a block diagram of an exemplary audio device 104. In the illustrated embodiment, the audio device 104 includes a receiver 200, a processor 202, the primary microphone 106, an optional secondary microphone 208, an audio processing system 210, and an output device 206 such as speaker 109. The audio device 104 may include further or other components necessary for audio device 104 operations. Similarly, the audio device 104 may include fewer components that perform similar or equivalent functions to those depicted in FIG. 2.

Processor 202 may execute instructions and modules stored in a memory (not illustrated in FIG. 2) in the audio device 104 to perform functionality described herein, including noise and echo reduction for an acoustic signal. Processor 202 may include hardware and software implemented as a processing unit, which may process floating point operations and other operations for the processor 202.

The exemplary receiver 200 is an acoustic sensor configured to receive the far-end acoustic signal Rx(t) from the communications network 114. In some embodiments, the receiver 200 may include the antenna device 105. The signal may then be forwarded to the audio processing system 210 to reduce noise and echo using the techniques described herein. The far-end acoustic signal Rx(t) is also provided to the output device 206 such as speaker 109.

The audio processing system 210 is configured to receive the primary acoustic signal c(t) from the primary microphone 106 and acoustic signals from one or more optional microphones, and process the acoustic signals. The audio processing system 210 is discussed in more detail below. The primary and secondary microphones 106, 208 may be spaced a distance apart in order to allow for detecting an energy level difference between them. The acoustic signals received by the primary microphone 106 and the secondary microphone 208 may be converted into electrical signals (i.e. a primary electrical signal and a secondary electrical signal). The electrical signals may themselves be converted by an analog-to-digital converter (not shown) into digital signals for processing in accordance with some embodiments. The primary acoustic signal c(t) and an optional secondary acoustic signal may be processed by the audio processing system 210 to produce a signal with an improved signal-to-noise ratio. It should be noted that embodiments of the technology described herein may be practiced utilizing only the primary microphone 106.

The output device 206 is any device which provides an audio output to the user 102. For example, the output device 206 may include the speaker 109, an earpiece of a headset, or handset of the audio device 104.

Figure 3:
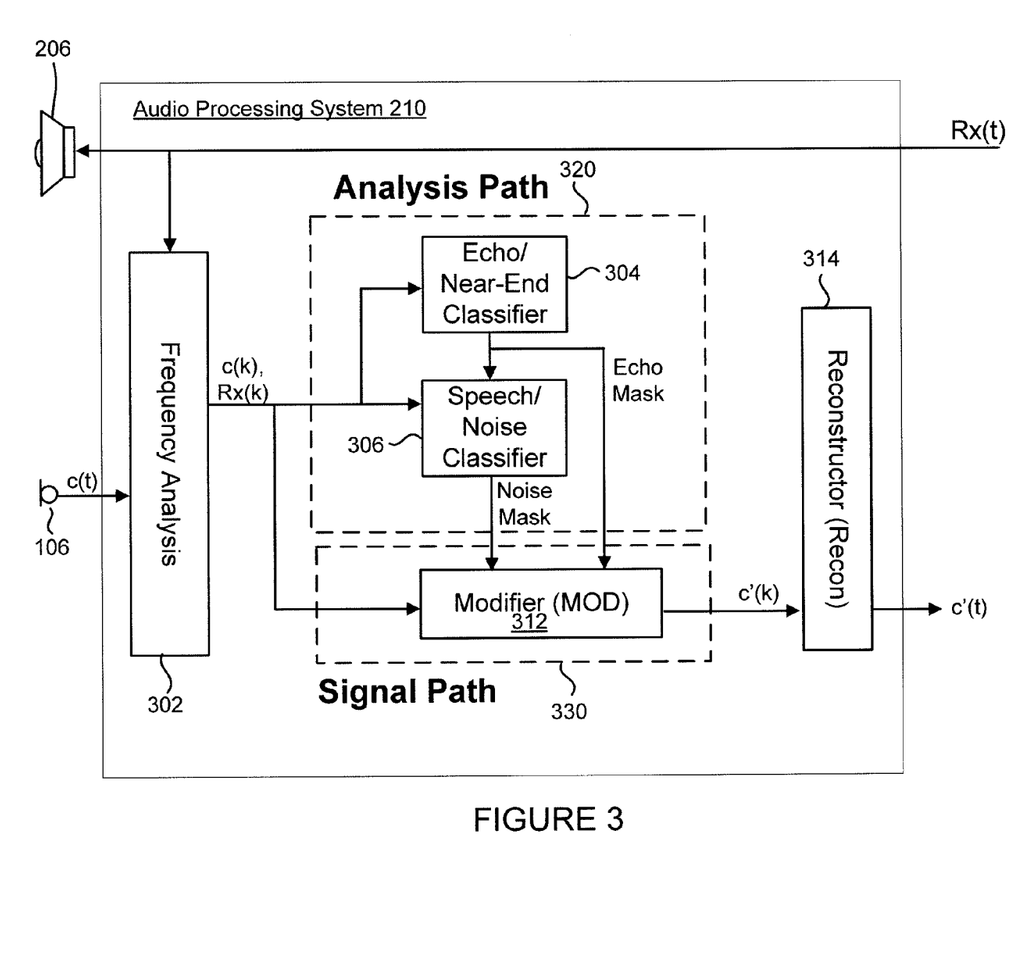
FIG. 3 is a block diagram of an exemplary audio processing system for performing noise and echo reduction as described herein.

FIG. 3 is a block diagram of an exemplary audio processing system 210 for performing noise and echo reduction as described herein. In exemplary embodiments, the audio processing system 210 is embodied within a memory device within audio device 104. The audio processing system 210 may include frequency analysis module 302, echo/near-end classifier module 304, speech/noise classifier module 306, modifier module 312, and reconstructor module 314. Audio processing system 210 may include more or fewer components than illustrated in FIG. 3, and the functionality of modules may be combined or expanded into fewer or additional modules. Exemplary lines of communication are illustrated between various modules of FIG. 3, and in other figures herein. The lines of communication are not intended to limit which modules are communicatively coupled with others, nor are they intended to limit the number of and type of signals communicated between modules.

In operation, the primary acoustic signal c(t) received from the primary microphone 106 and the far-end acoustic signal Rx(t) received from the communications network 114 are converted to electrical signals. The electrical signals are processed through frequency analysis module 302. In one embodiment, the frequency analysis module 302 takes the acoustic signals and mimics the frequency analysis of the cochlea (e.g., cochlear domain), simulated by a filter bank, for each time frame. The frequency analysis module 302 separates each of the primary acoustic signal c(t) and the far-end acoustic signal Rx(t) into two or more frequency sub-band signals. A sub-band signal is the result of a filtering operation on an input signal, where the bandwidth of the filter is narrower than the bandwidth of the signal received by the frequency analysis module 302. Alternatively, other filters such as short-time Fourier transform (STFT), sub-band filter banks, modulated complex lapped transforms, cochlear models, wavelets, etc., can be used for the frequency analysis and synthesis. Because most sounds (e.g. acoustic signals) are complex and include multiple components at different frequencies, a sub-band analysis on the acoustic signal is useful to separate the signal into frequency bands and determine what individual frequency components are present in the complex acoustic signal during a frame (e.g. a predetermined period of time). For example, the length of a frame may be 4 ms, 8 ms, or some other length of time. In some embodiments there may be no frame at all. The results may include sub-band signals in a fast cochlea transform (FCT) domain. The sub-band frame signals of the primary acoustic signal c(t) is expressed as c(k), and the sub-band frame signals of the far-end acoustic signal Rx(t) is expressed as Rx(k). The sub-band frame signals c(k) and Rx(k) may be time and frame dependent, and may vary from one frame to the next.

As will be discussed further below, the envelopes of the sub-band frame signals c(k) and Rx(k) are analyzed for echo suppression. Specifically, the envelopes of the far-end sub-band frame signals Rx(k) are used to predict the echo that will be present in the primary sub-band frame signals c(k).

The sub-band frame signals c(k) and Rx(k) are provided from frequency analysis module 302 to an analysis path sub-system 320 and to a signal path sub-system 330. The analysis path sub-system 320 may process the sub-band frame signals to identify signal features, distinguish between speech components, noise components, and echo components, and generate one or more signal modifiers. The signal path sub-system 330 is responsible for modifying primary sub-band frame signals c(k) by applying the one or more signal modifiers, such as one or more multiplicative gain masks and/or subtractive operations generated in the analysis path sub-system 320. The modification may reduce noise and echo to preserve the desired speech components in the sub-band signals. The analysis path sub-system 320 is discussed in more detail below.

Signal path sub-system 330 includes modifier module 312. The modifier module 312 receives the primary sub-band frame signals c(k) from the frequency analysis module 302. Using the techniques described herein, the modifier module 312 multiplies the primary sub-band frame signals c(k) with echo and noise masks provided by the analysis path sub-system 320. Applying the echo and noise masks reduces the energy levels of noise and echo components in the primary sub-band frame signals c(k) to form masked sub-band frame signals c'(k).

Reconstructor module 314 may convert the masked sub-band frame signals c'(k) from the cochlea domain back into the time domain to form a synthesized time domain noise and echo reduced acoustic signal c'(t). The conversion may include adding the masked frequency sub-band signals and may further include applying gains and/or phase shifts to the sub-band signals prior to the addition. Once conversion to the time domain is completed, the synthesized time-domain acoustic signal c'(t), wherein the noise and echo have been reduced, may be provided to a codec for encoding and subsequent transmission by the audio device 104 to the far-end environment 112 via the communications network 114.

In some embodiments, additional post-processing of the synthesized time-domain acoustic signal may be performed. For example, comfort noise generated by a comfort noise generator may be added to the synthesized acoustic signal prior to providing the signal to the user. Comfort noise may be a uniform constant noise that is not usually discernable to a listener (e.g., pink noise). This comfort noise may be added to the synthesized acoustic signal to enforce a threshold of audibility and to mask low-level non-stationary output noise components. In some embodiments, the comfort noise level may be chosen to be just above a threshold of audibility and may be settable by a user. In some embodiments, the analysis path sub-system 320 may have access to the level of comfort noise in order to generate gain masks that will suppress the noise and/or echo to a level at or below the comfort noise.

The echo/near-end classifier 304 receives the sub-band frame signals c(k) and Rx(k) provided by frequency analysis module 302. As described below, the echo/near-end classifier 304 analyzes the sub-band frame signals c(k) and Rx(k) to identify echo components within the primary sub-band frame signals c(k). The echo/near-end classifier 304 then generates an echo mask, which is provided to the modifier module 312 to reduce the energy level of the echo components. The values of the echo mask output from the echo/near-end classifier 304 may be time and sub-band signal dependent and optimize echo reduction on a per sub-band basis.

The echo/near-end classifier 304 incorporates a model of the echo path by which the far-end acoustic signal Rx(t) propagates into the primary microphone 106. The echo path includes the speaker 109 response, the acoustic path from the speaker 109 to the primary microphone 106, and primary microphone 106 response. In some embodiments, a linear model of the echo path can be effectively used in the echo/near-end classifier 304. In other embodiments, the echo conditions may be non-linear due to for example non-linearity in the speaker 109 response. In such a case, a non-linear model of the echo path may be used to achieve a more accurate echo classification.

The echo gain mask is generated based on predicted envelopes of the echo waveforms based on the far-end sub-band frame signals Rx(k). In one embodiment, by analyzing the sub-band frame signals c(k) and the predicted envelopes, a determination may be made as to when and where echo may be audible in the frequency sub-bands.

In exemplary embodiments, the echo/near-end classifier 304 computes estimates of the echo power spectra, and estimates of the near-end power spectra of speech and noise (i.e. that is not from the echo). The estimates of the echo and near-end speech and noise power spectra may then be subject to a square-root operation to transform the power spectra into amplitude levels. For a given frequency band, a sequence of such amplitudes over time comprises an envelope, or one amplitude per frame.

In exemplary embodiments, a prediction of an echo in a near-end envelope is used to determine whether the near-end envelope is dominated by echo to a point that the echo is audible. The prediction may be based on the envelope of the far-end acoustic signal Rx(t). For example, if there is no energy in the far-end envelope, there is likely no echo and thus no need for echo suppression. However, if there is energy in both the far-end and near-end envelopes, an echo within the near-end envelope is more likely. In such a case, echo suppression may be applied. The echo/near end classifier module 304 includes logic which analyzes the prediction versus an observation in order to determine where and when to apply echo suppression.

In some embodiments, the echo mask calculated by the echo/near-end classifier 304 may be derived from a binary determination of which sub-band frames are dominated by echo. For example, the echo mask for a sub-band frame can have a low value (e.g. 0) if the echo within the sub-band frame has an energy level above the near-end energy level of the speech and noise. Otherwise, the echo mask may have an "all pass" gain value of 1.

In other embodiments, the echo mask may be based on a ratio of the energy level of the echo component to the near-end energy level which is not from the echo (i.e. the energy level of speech and/or noise). In one embodiment this can be represented mathematically as:

$$G_E(t, k) = \frac{E_E(t, k)}{E_E(t, k) + E_{SN}(t, k)}$$

where $E_E$ is the estimated energy level of echo in the sub-band signal k of the primary acoustic signal during time frame t, and $E_{SN}$ is the estimated energy level that is not echo (i.e. is speech and/or noise) in the sub-band signal k of the primary acoustic signal during time frame t.

Determining energy level estimates of echo is described in more detail in U.S. patent application Ser. No. 12/077,436, entitled "System and Method for Envelope-Based Acoustic Echo Cancellation", which is incorporated by reference herein.

The echo mask derived by the echo/near-end classifier 304 is provided to the speech/noise classifier module 306. The speech/noise classifier module 306 also receives the sub-band frame signals c(k) from the frequency analysis module 302. The speech/noise classifier module 306 utilizes the echo mask in analyzing the primary sub-band frame signals c(k) to identify speech and noise components in non-echo dominated sub-band frames.

As described above, the values of the echo mask indicate which sub-band frames are dominated by echo, and which sub-band frames are dominated by speech and/or noise. The speech/noise classifier module 306 may use echo classification information inferred by the values of the echo mask to identify the sub-band frames to ignore when adapting its speech and noise models. The speech/noise classifier module 306 then computes speech and noise energy levels within the remaining sub-band frames to derive a noise mask for those sub-band frames. In some alternative embodiments, the speech/noise classifier module 306 may use a continuous soft decision approach when adapting its speech and noise models, rather than a binary decision; in such cases, a fraction of each sub-band frame is characterized as echo, and the remaining fraction is used for the speech and noise model adaptation As such, the speech/noise classifier module 306 determines energy levels of noise components based on the energy level of the echo components determined by the echo/near-end classifier 304. In other words, the speech/noise classifier module 306 utilizes the echo mask to determine an echo-reduced spectral energy representation of the primary sub-band frame signals c(k). The echo-reduced spectral energy representation is the remaining energy level in the primary sub-band frame signals c(k) which is not due to the echo. The speech/noise classifier module 306 analyzes the echo-reduced spectral energy representation to determine the speech and noise energy levels within the sub-band frame signals c(k). In alternative embodiments, the speech/noise classifier module 306 may utilize the values of the echo mask as a control signal to update or freeze the estimation of the speech/noise models.

The noise mask is provided to the modifier module 312 to reduce the energy level of the noise components in the primary sub-band frame signals c(k). The values of the noise mask output from the echo/near-end classifier may be time and sub-band signal dependent and may be derived so as to optimize noise reduction on a per sub-band basis.

By utilizing the echo classification information inferred by the echo mask, the speech/noise classifier module 306 can avoid adapting speech and noise models to the sub-band frames which have already been determined to be dominated by echo. As a result, the audio processing system 210 can avoid divergence between the speech/noise classifier module 306 and the echo/near-end classifier 304 as to which sub-band frames contain echo and which contain speech or noise.

In some embodiments, the noise mask may be based on Wiener filter gain mask values. The noise mask values may be based on the noise short-term power spectral density and a sub-band power spectral density during time frame t and sub-band signal index k. This can be represented mathematically as:

$$G_{wf}(t, k) = \frac{P_s(t, k)}{P_s(t, k) + P_n(t, k)}$$

where $P_s$ is the estimated power spectral density of speech in the sub-band signal k of the primary acoustic signal during time frame t, and $P_n$ is the estimated power spectral density of the noise in the sub-band signal k of the primary acoustic signal during time frame t.

An example of determining energy levels of speech and noise components is described in more detail in U.S. patent application Ser. No. 12/004,897, entitled "System and Method for Adaptive Classification of Audio Sources," filed on Dec. 21, 2007, the disclosure of which is incorporated by reference herein.

In embodiments, the noise and echo masks may be lower bounded such that the energy level of the noise and/or echo component in the sub-band signal may be reduced to no less than a residual target level, which may be fixed or slowly time-varying. In some embodiments, the residual target level is the same for each sub-band signal. Such a target level may be a level at which the noise component ceases to be audible or perceptible, below a self-noise level of a microphone used to capture the primary acoustic signal, or below a noise gate of a component such as an internal AGC noise gate or baseband noise gate within a system implementing the noise and echo reduction techniques described herein.

As described above, the modifier module 312 multiplies the primary sub-band frame signals c(k) with echo/noise masks provided by the analysis path sub-system 320. Applying the echo/noise masks reduces the energy levels of noise and echo components in the primary sub-band frame signals c(k) to form masked sub-band frame signals c'(k).

The audio processing system may be configured with more or less modules than those illustrated. An example of an audio processing system is described in U.S. patent application Ser. No. 12/860,043, entitled "Monaural Noise Suppression Based on Computational Auditory Scene Analysis," filed on Aug. 20, 2010, the disclosure of which is incorporated herein by reference.

Figure 4A:
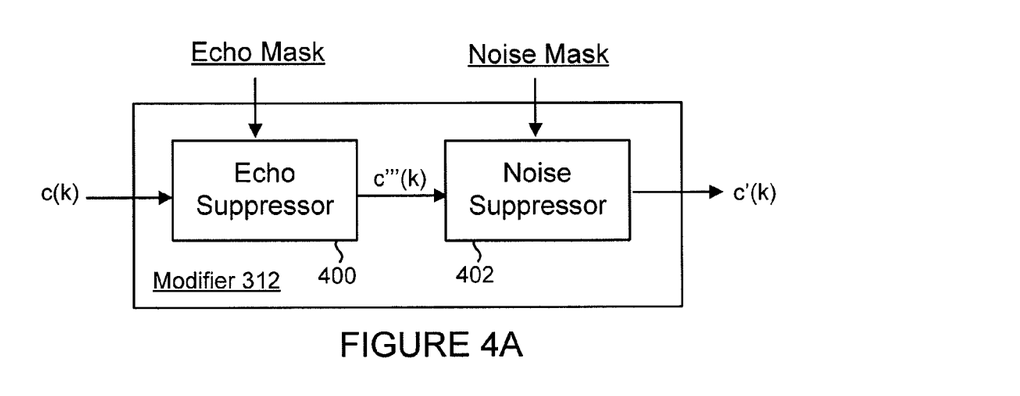
FIG. 4A is a block diagram of an exemplary modifier module.

FIG. 4A is a first block diagram of an exemplary modifier module 312. In FIG. 4A, the modifier module 312 includes an echo suppressor module 400 and a noise suppressor module 402. The echo suppressor module 400 receives the primary sub-band frame signals c(k) provided from frequency analysis module 302. The echo suppressor module 400 also receives the echo mask provided from the echo/near-end classifier module 304. The echo suppressor module 400 multiplies the primary sub-band frame signals c(k) by the echo mask values to form echo reduced sub-band frame signals c'''(k).

The noise suppressor module 402 receives the echo reduced sub-band frame signals c'''(k). The noise suppressor module 402 also receives the noise mask provided from the speech/noise classifier module 306. The noise suppressor module 402 multiplies the echo reduced sub-band frame signals c'''(k) by the noise mask values to form the masked sub-band frame signals c'(k).

Figure 4B:
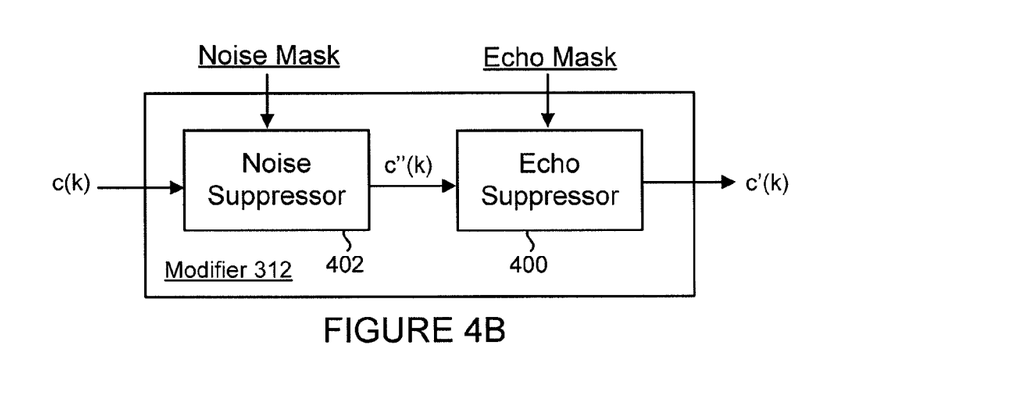
FIG. 4B is a second block diagram of an exemplary modifier module.

FIG. 4B is a second block diagram of an exemplary modifier module 312. In FIG. 4B the order of the echo suppressor module 400 and the noise suppressor module 402 is reversed compared to that in FIG. 4A, so that the noise mask is applied before the echo mask. The noise suppressor module 402 multiplies the primary sub-band frame signals c(k) by the noise mask values to form noise reduced sub-band frame signals c''(k). The echo suppressor module 400 multiplies the noise reduced sub-band frame signals c''(k) by the echo mask values to form the masked sub-band frame signals c'(k).

Figure 4C:
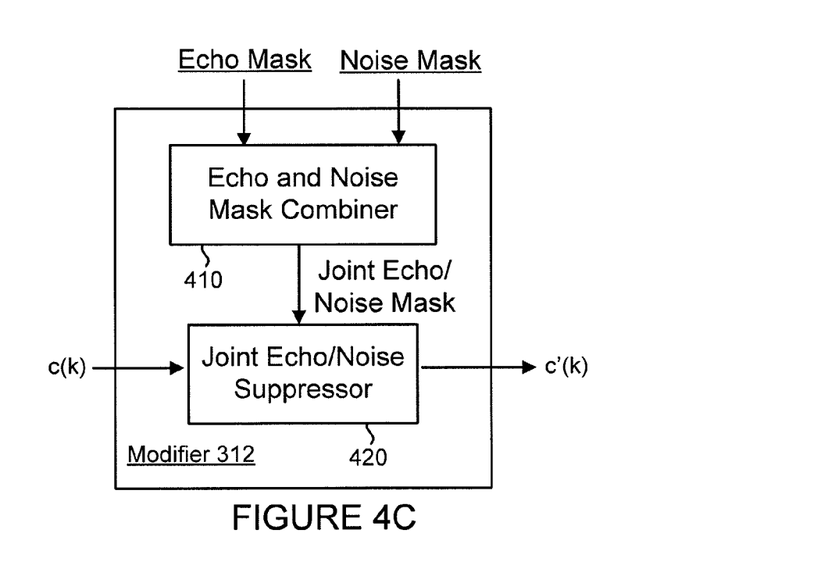
FIG. 4C is a third block diagram of an exemplary modifier module.

FIG. 4C is a third block diagram of an exemplary modifier module 312. In FIG. 4C, the modifier module 312 includes an echo and noise mask combiner module 410 and a joint echo/noise suppressor module 420. The echo and noise mask combiner module 410 receives the echo mask from the echo/near-end classifier module 304, and receives the noise mask from the speech/noise classifier module 306. The echo and noise mask combiner module 410 combines the echo mask with the noise mask to form a joint echo/noise mask. In one embodiment, the echo and noise mask combiner module 410 selects a minimum between the echo mask and the noise mask for each sub-band frame.

The joint echo/noise mask is provided to the joint echo/noise suppressor module 420. The joint echo/noise suppressor module 420 also receives the primary sub-band frame signals c(k) provided from frequency analysis module 302. The joint echo/noise suppressor module 420 multiplies the primary sub-band frame signals c(k) by the joint echo/noise mask to form the masked sub-band frame signals c'(k). As such, the joint echo/noise suppressor module 420 multiplies a single mask value to each sub-band frame to reduce the energy levels of both the noise and echo.

Figure 5:
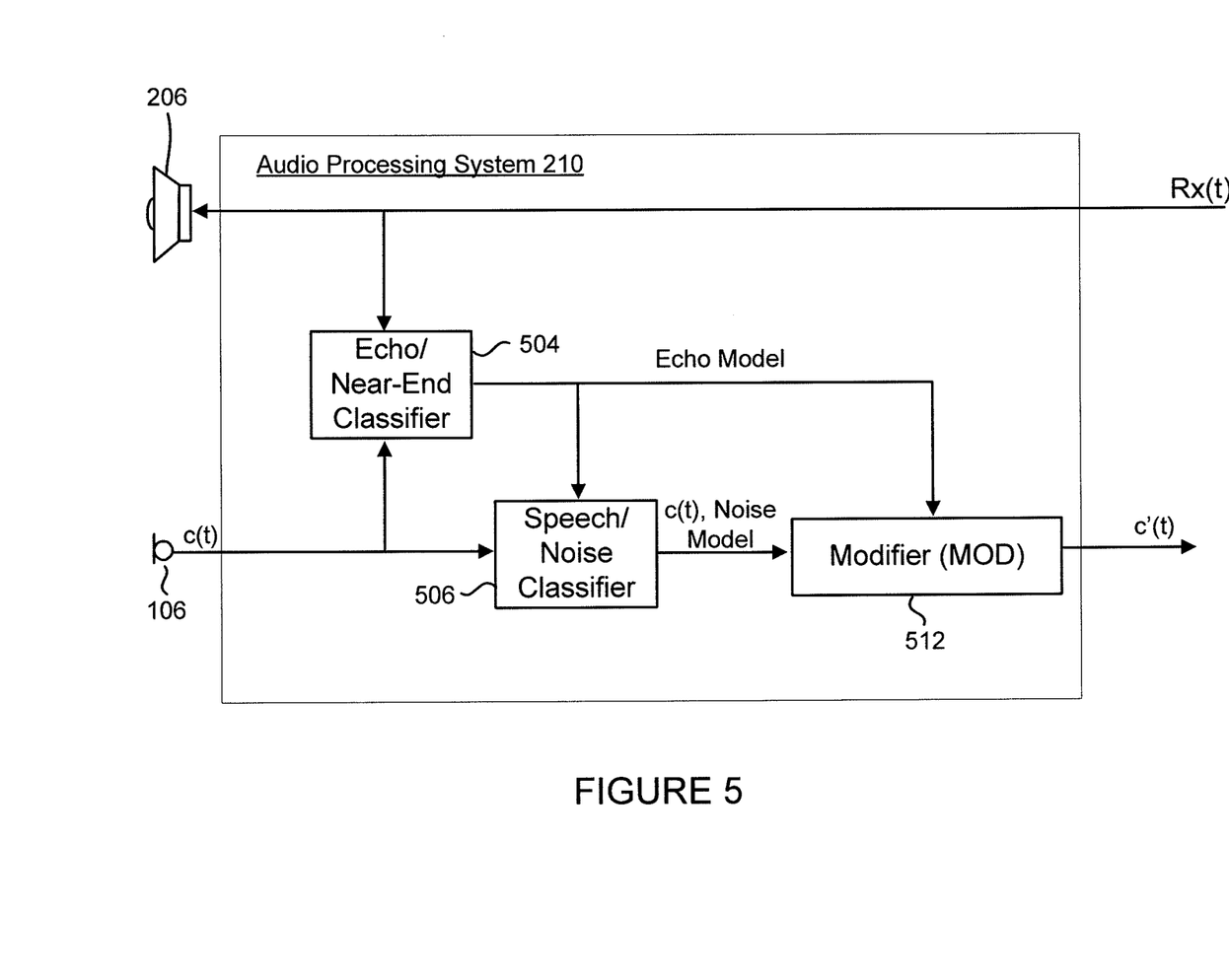
FIG. 5 is a second block diagram of an exemplary audio processing system.

FIG. 5 is a second block diagram of an exemplary audio processing system 210 for performing noise and echo reduction as described herein. In FIG. 5, noise and echo reduction is performed in the time-domain.

The audio processing system 210 may include echo/near-end classifier module 504, speech/noise classifier module 506, and modifier module 512. Audio processing system 210 may include more or fewer components than illustrated in FIG. 5, and the functionality of modules may be combined or expanded into fewer or additional modules.

The echo/near-end classifier module 504 receives the primary acoustic signal c(t) from the primary microphone 106 and the far-end acoustic signal Rx(t) from the communications network 114. Similar to the discussion above, the echo/near-end classifier module 504 analyzes the primary acoustic signal c(t) and the far-end acoustic signal Rx(t) to identify echo within the primary acoustic signal c(t). The echo/near-end classifier module 504 incorporates a model of the echo path by which the far-end acoustic signal Rx(t) propagates into the primary microphone 106.

The echo/near-end classifier module 504 then generates an echo model, which is provided to modifier module 512 to reduce the energy level of the echo. The echo model may be a model of the echo path or an estimate of the echo components in the primary acoustic signal c(t).

The echo model derived by the echo/near-end classifier module 504 is provided to the speech/noise classifier module 506. The speech/noise classifier module 506 also receives the primary acoustic signal c(t). Similar to the discussion above, the speech/noise classifier module 506 utilizes the echo model in analyzing the primary acoustic signal c(t) to identify speech and noise components in non-echo dominated time frames and frequencies of the primary acoustic signal c(t).

As described above, the echo model indicates which time frames and frequencies are dominated by echo, and which time frames and frequencies are dominated by speech and/or noise. The echo/near-end classifier module 504 uses the echo classification information inferred by the values of the echo model to identify the time frames and frequencies to ignore when adapting its speech and noise models. The speech/noise classifier module 506 then derives a noise model for reducing noise in the remaining time frames and frequencies.

The noise model is provided to the modifier module 512 to reduce the energy level of the noise components in the primary acoustic signal c(t). The values of the noise model output from the echo/near-end classifier 504 may be time frame and frequency dependent and may be derived so as to optimize noise reduction.

The modifier module 512 derives modifications based on the echo and noise models provided by the echo/near-end classifier module 504 and the speech/noise classifier module 506, and applies the derived modifications to the primary acoustic signal c(t) Applying the modification reduces the energy levels of noise and echo components in the primary acoustic signal c(t) to form the noise and echo reduced acoustic signal at).

Figure 6:
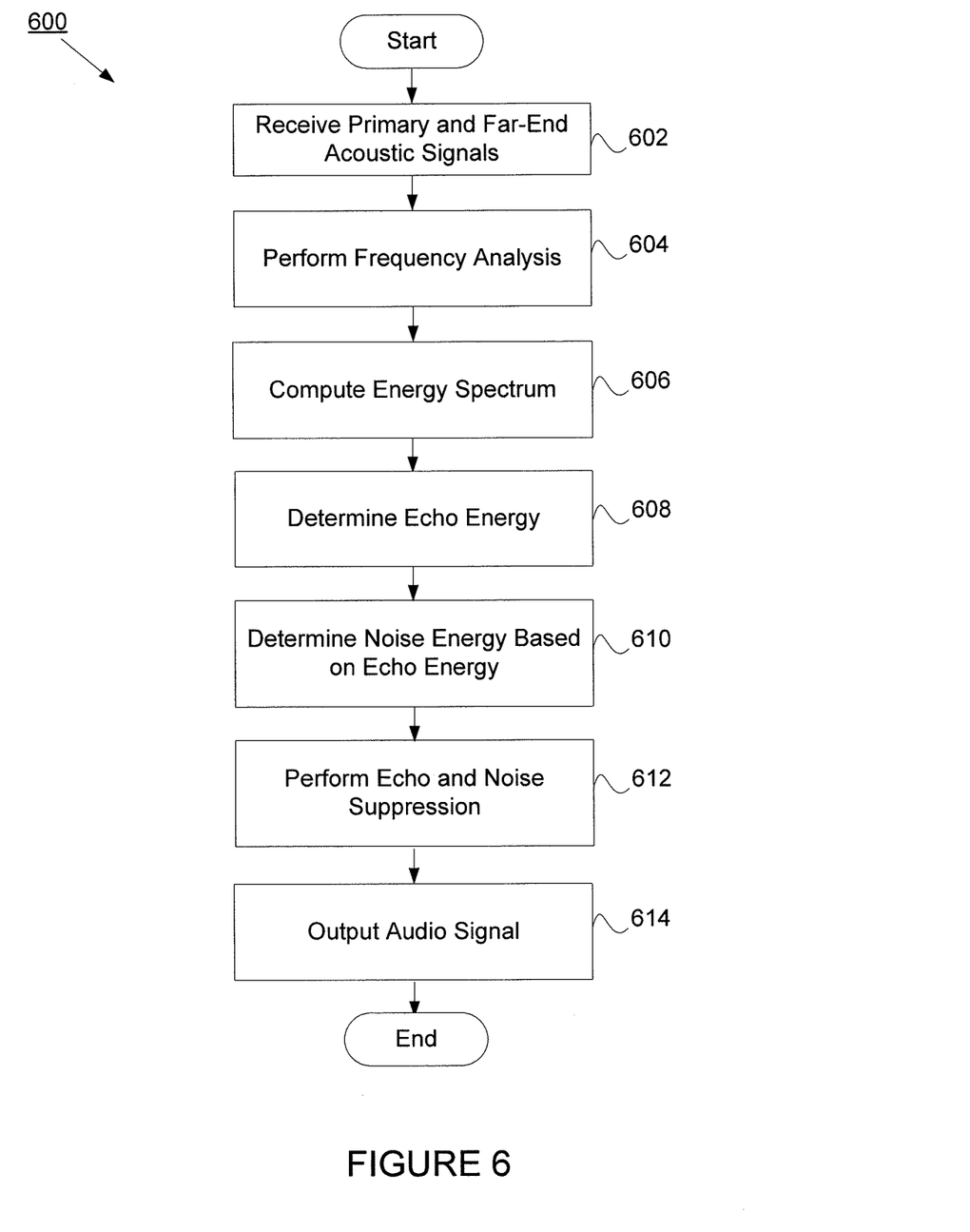
FIG. 6 is a flow chart of an exemplary method for performing echo and noise reduction of an acoustic signal.

FIG. 6 is a flow chart of an exemplary method 600 for performing echo and noise reduction of an acoustic signal. As with all flow charts herein, steps in FIG. 6 can be combined, performed in parallel, or performed in a different order, and the method of FIG. 6 may include additional or fewer steps than those illustrated.

In step 602, the primary acoustic signal c(t) is received by the primary microphone 106 and the far-end acoustic signal Rx(t) is received via the communication network 114. In exemplary embodiments, the acoustic signals are converted to digital format for processing.

Frequency analysis is then performed on the acoustic signals in step 604 to separate the acoustic signals into sub-band frame signals c(k) and Rx(k). The frequency analysis may utilize a filter bank to decompose the acoustic signal(s) into frequency bands.

In step 606, energy spectra for the sub-band frame signals c(k) and Rx(k) are computed. Once the energy estimates are calculated, estimates of the echo energy within the primary sub-band frame signals c(k) are computed at step 608. At step 610 estimates of the noise energy within the primary sub-band frame signals c(k) are computed based in part on the estimates of the echo energy in step 608.

In step 612 echo and noise masks are generated and applied to the primary sub-band frame signals c(k) to perform echo and noise suppression. The echo and noise suppression process is discussed in more detail below with respect to FIGS. 7A and 7B. At step 614, the noise and echo suppressed acoustic signal may then be transmitted by the audio device 104 to the far-end environment 112 via the communications network 114. The noise and echo suppressed acoustic signal may also be output to a user. In some embodiments, the digital acoustic signal is converted to an analog signal for output.

Figure 7A:
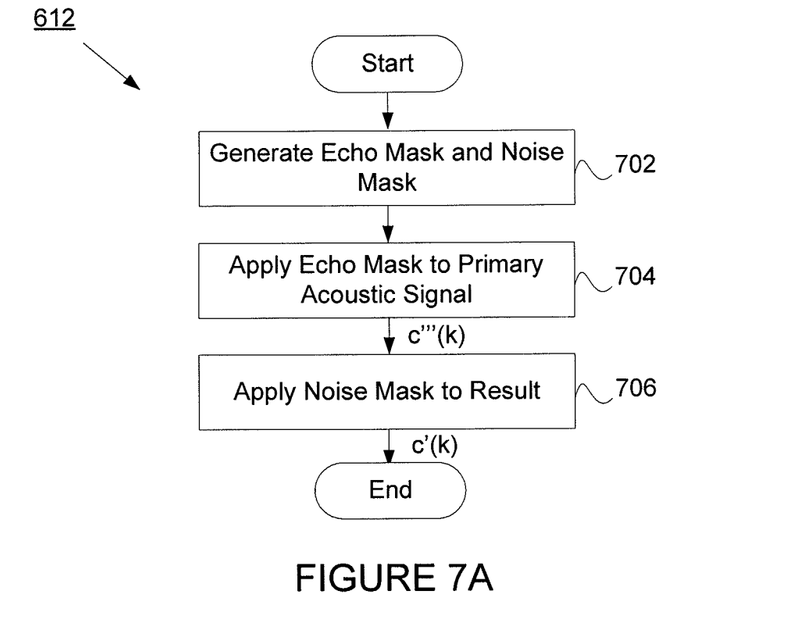
FIG. 7A is a first flow chart of an exemplary method for performing the echo and noise suppression step of FIG. 6.

FIG. 7A is a first flow chart of an exemplary method for performing the echo and noise suppression step 612 of FIG. 6. The method of FIG. 7A may include additional or fewer steps than those illustrated.

In step 702 the echo mask and the noise mask are generated using the techniques described herein. At step 704, primary sub-band frame signals c(k) are multiplied by the echo mask values to form echo reduced sub-band frame signals c'''(k). At step 706, the echo reduced sub-band frame signals c'''(k) are multiplied by the noise mask values to form the masked sub-band frame signals c'(k).

Figure 7B:
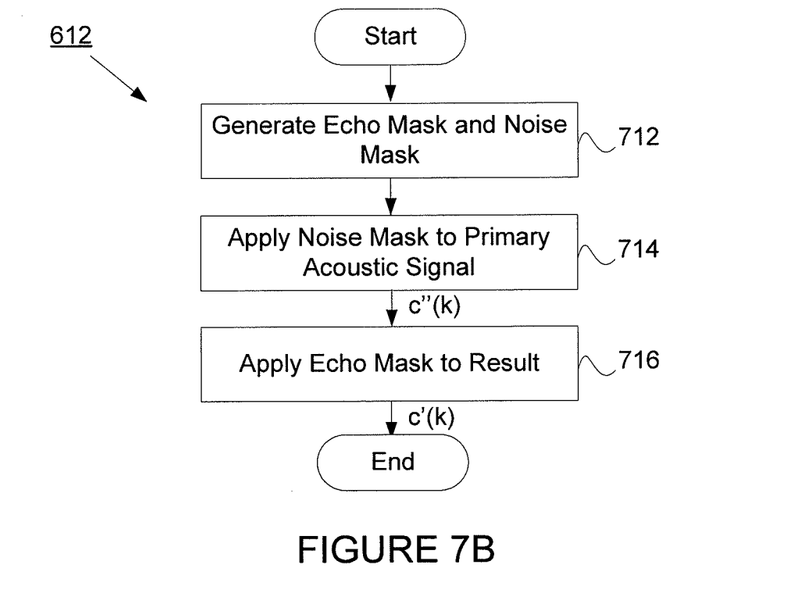
FIG. 7B is a second flow chart of an exemplary method for performing the echo and noise suppression step of FIG. 6.

FIG. 7B is a second flow chart of an exemplary method for performing the echo and noise suppression step 612 of FIG. 6. In step 712 the echo mask and the noise mask are generated using the techniques described herein. At step 714, the primary sub-band frame signals c(k) are multiplied by the noise mask values to form noise reduced sub-band frame signals c''(k). At step 716, the noise reduced sub-band frame signals c''(k) are multiplied by the echo mask values to form the masked sub-band frame signals c'(k).

In some embodiments, the method for performing echo and noise reduction for an acoustic signal may include combining the echo and noise masks as described above. In such a case, the combined echo/noise mask may then be applied to the primary sub-band frame signals c(k) to form the masked sub-band frame signals c'(k).

The above described modules may be comprised of instructions that are stored in a storage media such as a machine readable medium (e.g., computer readable medium). These instructions may be retrieved and executed by the processor 202. Some examples of instructions include software, program code, and firmware. Some examples of storage media comprise memory devices and integrated circuits. The instructions are operational.

As used herein, a given signal, event or value is "based on" a predecessor signal, event or value if the predecessor signal, event or value influenced the given signal, event or value. If there is an intervening processing element, step or time period, the given signal can still be "based on" the predecessor signal, event or value. If the intervening processing element or step combines more than one signal, event or value, the output of the processing element or step is considered to be "based on" each of the signal, event or value inputs. If the given signal, event or value is the same as the predecessor signal, event or value, this is merely a degenerate case in which the given signal, event or value is still considered to be "based on" the predecessor signal, event or value. "Dependency" on a given signal, event or value upon another signal, event or value is defined similarly.

While the present invention is disclosed by reference to the preferred embodiments and examples detailed above, it is to be understood that these examples are intended in an illustrative rather than a limiting sense. It is contemplated that modifications and combinations will readily occur to those skilled in the art, which modifications and combinations will be within the spirit of the invention and the scope of the following claims.

What is claimed is:

1. A method for reducing noise within an acoustic signal, the method comprising:

receiving a first acoustic signal and a second acoustic signal via a receiver, the first acoustic signal representing at least one captured sound;

determining an energy level of an echo component in the first acoustic signal, the echo component comprising the second acoustic signal reflected via an echo path;

deriving an echo modification for a plurality of first acoustic sub-band signals representing the first acoustic signal, the derived echo modification based on the determined energy level of the echo component in the first acoustic signal;

identifying speech/noise dominated first acoustic sub-band signals from the plurality of first acoustic sub-band signals using the derived echo modification, such that the identified speech/noise dominated first acoustic sub-band signals are not dominated by echo;

determining an energy level of a noise component for each of the identified speech/noise dominated first acoustic sub-band signals;

deriving a noise modification for the each of the speech/noise dominated first acoustic sub-band signals not being dominated by echo based on the determined energy level of the noise component;

applying the noise modifications to the first acoustic signal to reduce the energy level of the noise component and form a noise reduced signal; and applying the echo modification to the noise reduced signal to reduce the energy level of the echo component.

2. The method of claim 1, further comprising a plurality of second acoustic sub-band signals representing the second acoustic signal, wherein determining the energy levels of the echo and noise components and applying the noise modifications are performed on a per sub-band signal basis for the first and second acoustic signals.

3. The method of claim 1, wherein determining the energy level of the noise component for each of the identified speech/noise dominated first acoustic sub-band signals comprises:

determining a remaining energy level in the first acoustic signal not due to the echo component, wherein the energy level of the noise component is further determined based on the remaining energy level.

4. The method of claim 3, wherein:

applying the noise modifications comprises multiplying the first acoustic signal by a reduction value;

the reduction value is zero if the energy level of the echo component is greater than that of the remaining energy level in the first acoustic signal; and the reduction value is unity if the energy level of the echo component is less than that of the remaining energy level.

5. The method of claim 3, wherein:

applying the noise modification comprises multiplying the first acoustic signal by a reduction value; and the reduction value is dependent upon a ratio of the energy level of the echo component to that of the remaining energy level.

6. A non-transitory computer readable storage medium having embodied thereon a program, the program being executable by a processor to perform a method for reducing noise within an acoustic signal, the method comprising:

receiving a first acoustic signal and a second acoustic signal via a receiver, the first acoustic signal representing at least one captured sound;

determining an energy level of an echo component in the first acoustic signal, the echo component comprising the second acoustic signal reflected via an echo path;

identifying speech/noise dominated first acoustic sub-band signals using the determined energy level of the echo component, such that the speech/noise dominated first acoustic sub-band signals are not dominated by echo;

determining an energy level of a noise component for each identified speech/noise dominated first acoustic sub-band signal;

and applying a single reduction value to reduce the energy levels of both the noise and echo components of the speech/noise dominated first acoustic sub-band signals that are not dominated by echo, the single reduction value based on both the determined energy level of the echo component and the determined energy level of the noise component.

7. The non-transitory computer readable storage medium of claim 6, further comprising separating the first acoustic signal into a plurality of first acoustic sub-band signals;

separating the second acoustic signal into a plurality of second acoustic sub-band signals; and wherein determining the energy levels of the echo and noise components and applying the single reduction value is performed on a per sub-band signal basis for the first and second acoustic sub-band signals.

8. The non-transitory computer readable storage medium of claim 6, wherein determining the energy level of the noise component for each identified speech/noise dominated first acoustic sub-band signal comprises:

determining a remaining energy level in the first acoustic signal not due to the echo component, wherein the energy level of the noise component is further determined based on the remaining energy level.

9. The non-transitory computer readable storage medium of claim 8, wherein:

applying the single reduction value comprises multiplying the primary acoustic signal by the reduction value;

the reduction value being zero if the energy level of the echo component is greater than that of the remaining energy level in the first acoustic signal; and the reduction value being unity if the energy level of the echo component is less than that of the remaining energy level.

10. A system for reducing noise within an acoustic signal, the system comprising:

an audio processing system to:

separate a first acoustic signal into a plurality of first acoustic sub-band signals, the first acoustic signal representing at least one captured sound, separate a second acoustic signal into a plurality of second acoustic sub-band signals;

determine an energy level of an echo component in the first acoustic signal, the echo component comprising the second acoustic signal reflected via an echo path;

for each first acoustic sub-band signal, derive an echo mask based on the determined energy level of the echo component in the first acoustic sub-band signal;

identify speech/noise dominated first acoustic sub-band signals using the echo mask, such that the speech/noise dominated first acoustic sub-band signals are not dominated by echo;

determine an energy level of a noise component for each identified speech/noise dominated first acoustic sub-band signal; and derive a noise mask for the each of the speech/noise dominated first acoustic sub-band signals not being dominated by echo based on the determined energy level of the noise component.

11. The system of claim 10, wherein for each first acoustic sub-band signal, the audio processing system further:

applies the echo mask to the first acoustic signal to reduce the energy level of the echo component to form an echo reduced sub-band signal; and applies the noise mask to the echo reduced sub-band signal to reduce the energy level of the noise component of the echo reduced sub-band signal.

12. The system of claim 10, wherein:

the audio processing system applies the echo mask to the first acoustic signal;

the echo mask value being zero if the energy level of the echo component is greater than that of the remaining energy level in the first acoustic signal; and the echo mask value being unity if the energy level of the echo component is less than that of the remaining energy level in the first acoustic signal.

13. The system of claim 10, wherein for each first acoustic sub-band signal, the audio processing system further:

applies the noise mask to the first acoustic signal to reduce the energy level of the noise component to form a noise reduced sub-band signal; and applies the echo mask to the noise reduced sub-band signal to reduce the energy level of the echo component of the noise reduced sub-band signal.

14. The system of claim 10, wherein the audio processing system:

determines a remaining energy level in the first acoustic signal not due to the echo component; and the energy level of the noise component is determined based on the remaining energy level.

15. The system of claim 10, wherein the audio processing system utilizes values of the echo mask as a control signal to update or freeze an estimation of a speech/noise model.

* * * * *